Sept. 25, 1934.  J. P. GERAGHTY  1,974,489
SAFETY MECHANISM FOR AUTOMOBILE ENGINES
Original Filed June 30, 1931   3 Sheets-Sheet 1
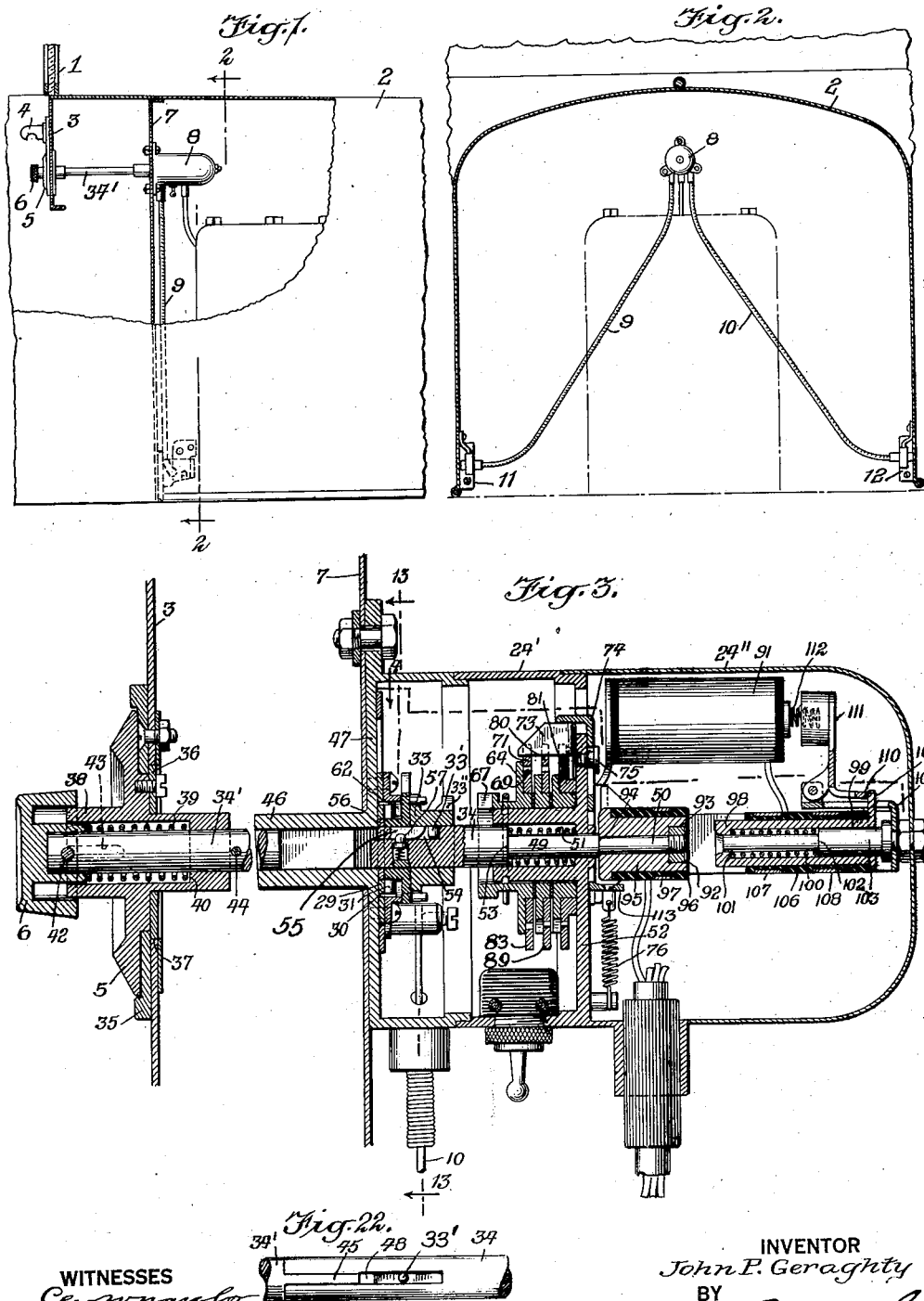
WITNESSES
INVENTOR
John P. Geraghty
BY
ATTORNEYS Sept. 25, 1934.   J. P. GERAGHTY   1,974,489
SAFETY MECHANISM FOR AUTOMOBILE ENGINES
Original Filed June 30, 1931   3 Sheets-Sheet 2
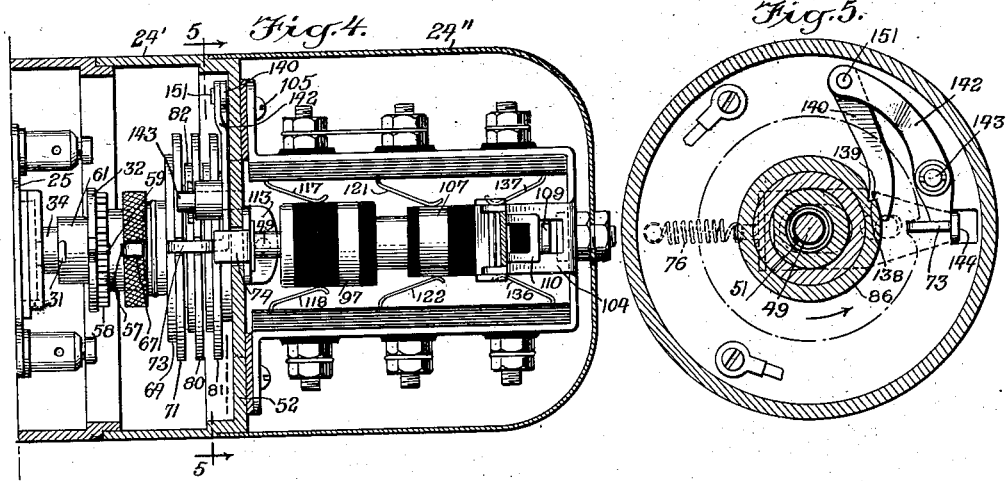
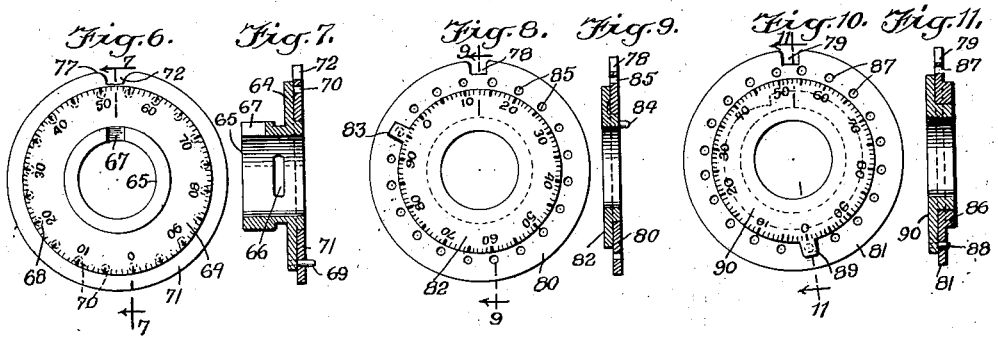
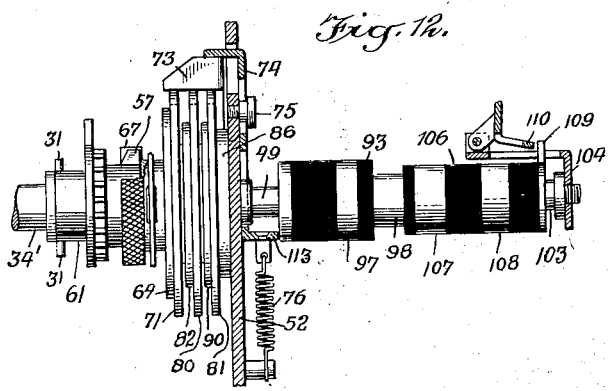
WITNESSES
INVENTOR
John P. Geraghty
BY
ATTORNEYS Sept. 25, 1934.    J. P. GERAGHTY    1,974,489
SAFETY MECHANISM FOR AUTOMOBILE ENGINES
Original Filed June 30, 1931    3 Sheets-Sheet 3
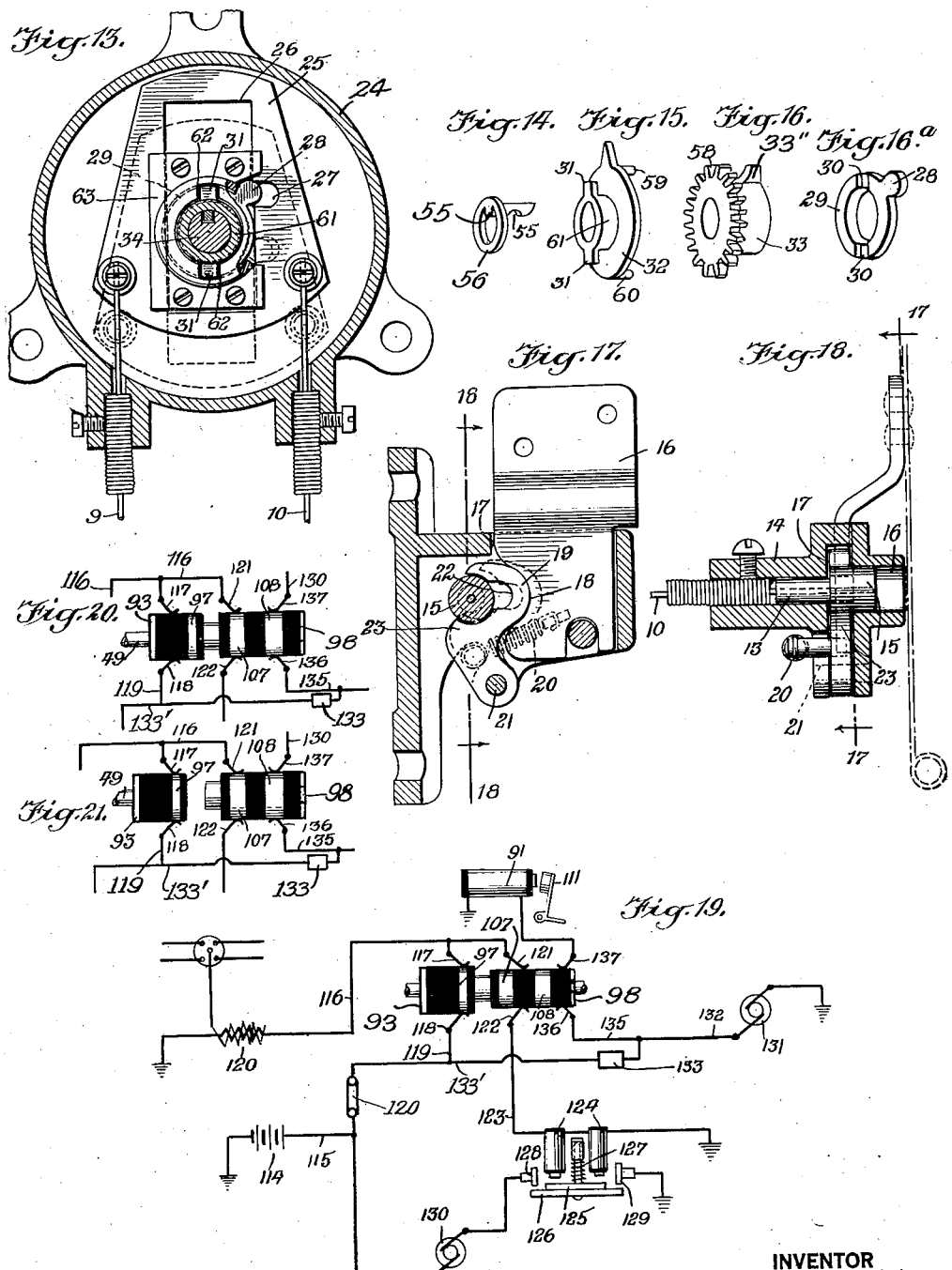
WITNESSES
INVENTOR
John P. Geraghty
BY
ATTORNEY Patented Sept. 25, 1934

1,974,489

UNITED STATES PATENT OFFICE 1,974,489

SAFETY MECHANISM FOR AUTOMOBILE ENGINES

John P. Geraghty, Jersey City, N. J.; John G. Flanigan executor of estate of said John P. Geraghty, deceased Application June 30, 1931, Serial No. 548,000
Renewed February 16, 1934

4 Claims. (Cl. 200—45)

This invention relates to safety mechanism for automobile engines and particularly to an improved device which functions to control the starting and stopping of the engine as well as locking the engine against functioning and locking the hood against opening.

An object of the invention is to provide a complete structure functioning as a unit wherein by an operation of a single member the hood of the automobile may be locked or unlocked and the ignition and starter circuits opened and closed.

Another object of the invention is to provide an improved safety mechanism for automobiles wherein a combination lock is associated with other parts and with certain circuits for holding certain of the circuits open under some circumstances, and for permitting the closing temporarily and permanently of certain circuits so that when the lock has been moved to an operative or unlocked position, certain of the circuits may be closed manually and others closed automatically for causing the starter of the engine to function and then the generator and the ignition circuits to function.

An additional object is to provide in an automobile engine a combination lock with coacting parts positioned so that the ignition circuit is locked open when the engine is standing still and also so that when the lock is actuated to an inoperative position, the ignition circuit is closed as well as the starter circuit, whereby the engine will immediately begin to function.

A still further object of the invention is to provide a simplified improvement over my prior Patents Nos. 1,592,763; 1,598,572; and 1,511,119.

In the accompanying drawings—

Figure 1 is a fragmentary side view of part of an automobile showing part of the hood and associated parts, a portion of the structure being broken away for better illustrating the invention.

Figure 2 is a sectional view through Figure 1 on line 2—2.

Figure 3 is an enlarged longitudinal vertical sectional view through the lock dial and certain other operating mechanisms shown in Figure 1.

Figure 4 is a sectional view through Figure 3 approximately on line 4—4, the same showing most of the parts in top elevation.

Figure 5 is a sectional view through Figure 4 on line 5—5.

Figure 6 is a front view of one pair of disks forming part of the lock shown in Figure 3.

Figure 7 is a sectional view through Figure 6 approximately on line 7—7.

Figure 8 is a view similar to Figure 6 but showing a second pair of disks.

Figure 9 is a sectional view through Figure 8 on line 9—9.

Figure 10 is a view similar to Figure 6 showing a third pair of locking disks.

Figure 11 is a sectional view through Figure 10 on line 11—11.

Figure 12 is a side view of the locking mechanism and certain associated parts including part of the reciprocating switch mechanism illustrated in Figure 4.

Figure 13 is a fragmentary sectional view through Figure 3 approximately on line 13—13.

Figure 14 is a detailed perspective view of the locking catch embodying certain features of the invention.

Figure 15 is a perspective view of a lock setting mechanism embodying certain features of the invention.

Figure 16 is a perspective view of a clutch mechanism embodying certain features of the invention.

Figure 16a is a perspective view of a ring embodying certain features of the invention.

Figure 17 is an enlarged fragmentary view partly in section and partly in elevation showing the hood locking mechanism.

Figure 18 is a sectional view through Figure 17 on line 18—18.

Figure 19 is a diagram showing the circuit of the various switch mechanisms as they appear when the parts are in running position.

Figure 20 is a diagram showing the switch mechanism as it appears when certain circuits are closed manually.

Figure 21 is a diagram showing a switch mechanism in the position which it occupies during starting.

Figure 22 is a fragmentary top plan view of the control bolts or rods shown in Figure 3, the same illustrating the sliding connections between these two members.

Referring to the accompanying drawings by numerals, 1 indicates an automobile of any desired kind, the same being provided with a hood 2 of any preferred kind and with an instrument board 3 also of any preferred kind. Preferably the instrument board has a lamp 4 arranged thereon immediately above the dial 5 and the hand operated knob 6. A short distance in front of the instrument board 3 is a front wall 7 which may be of any preferred structure. Carried by this front wall is a mechanism 8 which is associated with the dial 5 and thumb member 6 for accomplishing certain results including the control of the engine and locking of the hood 2. In locking the hood 2, Bowden wires 9 and 10 are used, said wires at one end extending into the mechanism 8 so as to be reciprocated by certain parts of said mechanism as hereinafter fully described. These wires extend downwardly to convenient points where they are connected to the respective locking mechanisms 11 and 12 which are adapted to lock the hood 2 closed. This locking mechanism is illustrated more particularly in Figures 17 and 18. As indicated in Figure 18, the Bowden wire 10 is provided with an enlargement 13 adapted to reciprocate in a fitting 14. The enlargement 13 has an elongated cylindrical head 15 adapted to reciprocate in the guide 16 forming part of the fitting 14. The fitting 14 is provided with what may be termed a notch 17 which is adapted to receive the bracket 16' riveted or otherwise rigidly secured to the hood 2. This bracket at the lower end is provided with an arc-shaped recess 18 in which the locking hook 19 rests. A contractile spring 20 acts to swing the hook 19 on its pivotal support 21 until it assumes the position shown in Figure 17. When the bracket 16' has been moved out of notch 17 the hook 19 will swing over to the dotted position shown in Figure 17. When the Bowden wire 10 has been pushed by the mechanism to be hereinafter fully described and shown particularly in Figure 13, the reduced portion 13 will come opposite the hook 19 and permit the hook to swing outwardly so that the portion 22 will receive reduced portion 13 thus causing the hook to be moved completely out of the notch 18.

It will be understood that the hook does not move out of the notch 18 because of the spring 20 but as the bracket 16' is pulled upwardly it will be forced out of notch 18 so that the portion 22 will surround the reduced section 13. When the reduced section 13 is opposite the portion 22, hook 19 is free to swing and consequently the hood may be opened and closed readily. After the bracket 16' has been moved out of the notch 17, the hook 19 swings to the dotted position shown in Figure 17 and the cam or enlargement 23 moves to the dotted position shown in Figure 17 whereupon the cylindrical section 15 cannot be moved back to the position shown in Figure 18. This will prevent a longitudinal movement of the Bowden wire 10 and consequently will prevent the shutting off of the engine. However, as soon as the hood has been closed and the bracket 16' moved to the position shown in Figure 17, the hook 19 will be swung over to the full line position shown in Figure 17 so that the Bowden wire 10 may be moved to shift the cylindrical section 16 to the position shown in Figure 18 whereupon the hook 19 is locked against movement and consequently bracket 16 is locked within the fitting 14, which fitting is rigidly secured in any desired manner to the chassis of the automobile.

The Bowden wires 9 and 10 are identical and function in the same way. The locks 11 and 12 will function as just described. Bowden wires 9 and 10 extend to a position within the casing 24 where they are connected to a reciprocating plate 25. This plate has a rectangular slot 26 formed with a notch 27. Notch 27 is adapted to receive the projection 28 of the disk or ring 29, which disk is provided with one or more depressions 30 for receiving the respective pins 31 formed integral with the lock setting device 32 (Figures 3 and 15). This device is connected through clutch 33 and certain other parts hereinafter fully described to the shaft 34 whereby whenever shaft 34 is rocked, ring 29 will be moved correspondingly and will cause the projection 28 to raise or lower the plate 25 according to the direction of movement. This will raise or lower the wires 9 and 10 to lock or unlock the respective hood locking mechanisms 11 and 12. The shaft 34 cannot be moved inwardly until after the plate 25 and associated parts have been moved to lock the locking mechanisms 11 and 12.

As shown particularly in Figure 3, the dial 5 is rotatably mounted in a plate 35 which is bolted or otherwise rigidly secured to the instrument board 3. A supporting disk 36 is screwed or otherwise rigidly secured to the dial 5 at the back thereof, said disk resting in a suitable aperture 37 in the instrument board 3. This provides an efficient support and mounting for the disk 36 whereby the disk cannot be removed without opening the hood 2. A tubular structure 38 is preferably formed integral with the dial 5 and carries a spring 39 pressing at one end against the shoulder 40 and at the opposite end against the thumb member or knob 6. A pin 42 extends through knob 6 and through a slot 43 formed in shaft 34'. This shaft carries a pin 44 for limiting the outward movement of the shaft under the action of spring 39. Shaft 34' is formed with a tongue 45 at its inner end which is the right hand end as seen in Figure 3, said tongue end fitting into a tubular extension 46 preferably formed integral with the front plate 47 of casing 24. This casing is provided with a ring 24' and a cap 24'' whereby the parts are properly protected and supported. The plate 47 is bolted or otherwise rigidly secured to the wall 7 but interiorly thereof as shown in Figures 1 and 3. The tongue 45 of shaft 34' fits into the slot or notch 48 of the shaft 34, which shaft is formed with reduced extensions 49 and 50, extension 49 being surrounded by a spring 51 acting against the plate or wall 52 preferably formed integral with the ring 24', said spring also acting against the shoulder 53 for urging shaft 34 and the parts connected therewith to the left as shown in Figure 3. Shaft 34 is provided with a longitudinally positioned slot 54 accommodating the tongue 55 which is integral with the ring 56, said tongue being held in place by a spring pressed pin 57. The tongue 55 acts against the pin 33' extending from the clutch 33 for holding the clutch so that it will move with the shaft 34. Clutch 33 as shown in Figure 16 is provided with a clutch tooth 33' and with a gear wheel 58. Gear wheel 58 is adapted to receive the pins or projections 59 and 60 projecting from the lock setter 32. Lock setter 32 is provided with a tubular extension 61 which carries pins 31 which pins are adapted to move through their respective notches at 62 in the raised part of plate 63 (Figure 13). This plate is screwed or otherwise rigidly secured to the end plate 47 of casing 24 whereby this plate is rigid. By reason of this structure, the pins 31 must be in line with notches 62 in order to move into the position shown in Figure 3 which position is essential to an actuation of the ring 29 and projection 28 for opening or closing the hood locking mechanisms 11 and 12. As it is necessary to rotate the parts to slide plate 25 downwardly, it will be seen that when this plate is in the lower position and the locks 11 and 12 unlocked, shaft 34 cannot be moved inwardly or outwardly, and thus the locking mechanism hereinafter fully described and the switch mechanism hereinafter fully described cannot be actuated.

The locking mechanism 63 is shown more or less in detail in Figures 6 to 11 inclusive and also in Figures 3, 4 and 12. As shown in these figures, it will be seen that the numbered or combination disk 64 is provided with a tubular extension 65 having a slot 66 or if desired, a pair of slots, the same being on diametrically opposite sides. Also a notch 67 is provided in the tubular extension 65, said notch being adapted to receive the clutch tooth 33'' on the clutch 33 when the clutch has been forced inwardly from the position shown in Figure 3 to that shown in Figures 4 and 12. When the parts are in the position shown in Figures 4 and 12, the knob 6 and dial 5 may be rotated for moving the locking mechanism 63 to a locked or unlocked position. The disk 64 is provided with a number of graduations 68 thereon and with a pin 69 extending through one of the apertures 70 in the actuating disk 71, which disk is provided with a notch 72 for receiving the locking plate 73 preferably formed integral with the lever 142 coacting with plate 74 which is guided by a screw 75 so as to slide parallel to the wall 52. This slide plate has a tendency to move downwardly through the action of the spring 76 but will be moved upwardly against such action by the rounded edges 77 of notch 72 when the same is in line with the notches 78 and 79 of the actuating disks 80 and 81. Disk 80 is identical with disk 71 except that it accommodates the combination disk 82 which is provided with a lug 83 having a pin 84 extending through one of the apertures 85. The same is true of the disk 81 except that this disk is provided with an annular bearing section 86. However, it will be seen that this disk 81 is provided with apertures 87 for receiving the pin 88 carried by extension 89 of disk 90. When these disks are arranged in operative position as shown in Figure 3, preferably washers are arranged therebetween to provide a slight spacing, said washers being arranged between the respective disks 64, 82 and 90. When all of the notches 72, 78 and 79 are in line as shown in Figure 3, the locking plate 73 will move downwardly under the action of spring 76 and fit into these notches whereupon spring 51 may function to force the rod or shaft 34 to the position shown in Figure 3. Also when the parts are thus set, rod 34 may be pushed inwardly manually at any time but will automatically move outwardly under the action of the springs 51 as long as the locking plate 73 is fitting into the notches 72, 78 and 79. This will allow the parts to be actuated manually when necessary, as for instance when it is desired to push the shaft inwardly and allow the parts to operate automatically as for instance when the spring 51 functions and also when the magnet 91 functions as hereinafter described. The reduced extension 50 of shaft 34 carries a nut 92 whereby the switch 93 is locked against the shoulder 94. This switch is preferably formed with a metal body 95 and on this body is mounted a tube 96 of insulation, said tube carrying a ring 97 of metal presenting an annular contact. Coacting with the switch 93 carried by extension 50 and held in place by nut 92 is a switch mechanism 98, the same consisting of a tubular member 99 carrying spring 100 which acts against the shoulder 101 and against the shoulder 102, for giving the body 99 a tendency to move to the left as shown in Figure 3. Shoulder 102 is part of the shaft 103 which is soldered or otherwise rigidly secured to a fitting 104, which fitting is bolted or otherwise rigidly secured to the wall 52 by suitable screws or other means 105 (Figure 4). An insulating sleeve 106 is rigidly mounted on the body 99 and carries spaced metallic rings 107 and 108 which act as contact rings. The body 99 has a plate 109 formed integral therewith or rigidly secured thereto and projecting into the path of movement of the extension 110 of the pivotally mounted armature 111. This armature is normally held in the position shown in Figure 3 by a spring 112 but when the magnet 91 is energized, it will be attracted over toward the magnet sufficiently to move the extension 110 away from plate 104 whereupon spring 100 may function and move the switch 98 to the left as shown in Figure 20, said movement being sufficient for tubular member 99 to strike the end of switch 93. This will be the running position as shown in Figure 19. When it is desired to stop the engine, the knob 6 is forced inwardly until it is in the position shown in Figure 12 and then rotated. Upon the rotation of the knob 6, one or more of the locking disks will be moved for raising the locking plate 73 as shown in Figure 12. The raising movement of the locking plate will cause the plate 74 to slide upwardly and cause the projection 113 to move in front of the body 95 which carries switch 93 so that the switch 93 will be locked in this position. When the parts are in this position, the starter circuit and ignition circuit will open so that the engine cannot receive the spark. When the locking disks are moved back so that the notches therein will be in alinement and so that spring 76 can move the extension 113 out of the way of switch 93, said switch will move under the action of spring 51 to the left as shown in Figure 3 so that the parts will immediately assume the positions shown in Figure 3. This will bring the contact ring 97 into contact with certain contact fingers whereby the starter and ignition circuits are closed, thus permitting the engine to be turned over and also permitting the engine to receive the proper sparks. It will thus be seen that as soon as the dial 5 has been moved so that the notches of the locking disk will be in alinement and pins 30 each in alinement with the notches 62 in plate 63, the engine will immediately and automatically start.

In order to better understand the circuits involved, attention is called particularly to Figures 19 to 21 inclusive. Figure 20 shows the position of the parts as soon as the knob 6 has been pushed inwardly. When in this position, current will be supplied to the starter but there will be no starting of the engine as the ignition circuit is not yet closed. However, if the knob 6 is released and forced outwardly quickly by spring 39, the switch 93 will move to the position shown in Figures 3 and 21. This is what may be termed a starting position as current from the battery 114 will pass through wire 115, wire 116, contact finger 117, ring 97, contact finger 118, wire 119, switch 120, and primary of the spark coil 120. This will provide current to produce the spark as soon as the engine has been turned over. In addition to the current flowing in this circuit, current will pass from wire 116 through contact finger 121, ring 107, contact finger 122, wire 123, electric magnet 124 and from thence to the ground. As these magnets are energized, they will attract the armature 125 so that switch plate 126 will be moved upwardly against the action of spring 127 until it engages the contacts 128 and 129. Contact 129 is connected with the ground while contact 128 is connected to one side of the starter 130 and to the opposite side of the starter is connected wire 115. It will thus be seen that when the parts are in the starting position as shown in Figure 21, current will pass from battery 114 through the ignition system and also to the starter. This will cause the engine to turn over and to explode in the usual way.

As soon as the engine begins to function, it will cause the generator 131 to function. Up to this time, the engine has been running on current from the battery 114. As soon as the generator 131 begins to function, it will supply current through wire 132 and a device 133 which permits the current to flow in one direction but not in the opposite direction, said device being old and well known on the market. From the device 133 current flows through wire 135 to the contact finger 136 and from thence through the ring 108, contact fingers 137, wire 130, electromagnet 91 and from thence to the ground, thus completing a circuit for the magnet 91 whereupon armature 111 will be swung over against the action of spring 112 (Figure 3). This will cause the extension 110 to move away from the plate 109 and thereby permit spring 100 to move the switch 98 to the left as shown in Figure 3, or until the parts have assumed the position shown in Figure 19. When the parts are moved to the position shown in Figure 19, it will be seen that the battery 114 is cut out and the starter is cut out, thus the current for the ignition system will be fed from he generator 131 and any excess current will pass in a reverse direction through wire 119, fingers 118 and 117, wire 116 and wire 115. As fingers 121 and 122 are now positioned on insulating material, magnets 124 will be de-energized whereupon spring 127 will function to move the contact bar 126 away from contacts 128 and 129, thus breaking the circuit of the battery 114 through the starter 130. All the actions just described take place very quickly and the engine starts immediately upon the switch 93 moving to the position shown in Figures 3 and 21. Almost immediately thereafter, the switch 98 will follow suit and move to the position shown in Figure 19. As shown in Figures 3 and 19, a hand operated switch 120 is provided in the ignition circuit. This is used in order to permit the opening of the circuit when it is desired to adjust or repair or examine the engine or any part connected therewith. When this circuit is open if the hood should be locked by the owner it will be impossible to start the engine without first unlocking the hood and closing the switch.

All the parts work automatically except the dial 5 and knob 6 and the parts mechanically connected therewith for actuation. In view of this arrangement of parts, there is no necessity for the ordinary starting foot pedal or for the usual ignition switch. All these things are combined. When the arrangement is stationary and the parts locked, in order to start the engine, the driver has only to rotate the dial 5 until the parts are unlocked whereby the knob 6 will automatically move outwardly under the action of spring 39 and the engine start. To stop the engine, it will be only necessary to push in the knob 6. If it is desired to stop the engine and maintain the engine stopped, it will be necessary to push in the knob 6 and then give the dial 5 a slight turning movement or large turning movement as desired. By reason of the locking mechanism just described, a slight turning movement toward the right will upset the combination so that the driver must go through the usual process in unlocking the same. This is to prevent a careless driver from turning the combination toward the right a degree or two and then expect to turn the same back the same distance and have the car start. If this were possible, a thief might readily steal the car by merely turning the dial back to the starting point. However, as described, this cannot be done and consequently whoever starts the car must know the combination.

In regard to the combination lock 63, it will be noted that the thickened enlargement as shown in Figure 11 is provided with a pawl receiving notch 138 (Fig. 5) which receives the tooth 139 of the link 140. Link 140 is pivotally connected at 141 to the arm 142 which arm is pivotally mounted at 143 on the wall 52. This arm carries an abutment 144 overlying the locking plate 73 as shown in Figures 3 and 5. By reason of this structure, whenever the locking plate 73 is raised and the combination is to be upset, arm 142 will be given a swinging movement sufficient to push the link 140 so that the notch 79 will be out of registry with the locking plate 73.

By reason of the structure presented, disk 71 will be moved out of registry with the plate 73 through the action of tooth 57 and associated parts when the combination is upset and in addition, disk 81 will be moved slightly out of registry so that it will be impossible for anyone to merely move the parts in one direction a short distance and then move them back into registry.

Concerning the combination lock, it will be noted that the pins 69 and 84 are adapted to strike against the extensions or lugs 83 and 89 respectively for collecting the various disks in order that the apertures may be properly lined up for receiving the locking plate 73.

I claim:

1. A combination lock including a plurality of combination dials, a notched actuating plate adjustably secured to each of said dials, manually actuated means for moving said dials and actuating plates until the notches in said plates are aligned, a reciprocating locking plate, means forcing said reciprocating locking plate into said notches when the notches are in alignment, one of said actuating plates having a pawl receiving notch, a pivotally mounted pawl positioned so that one end will enter said pawl receiving notch when the first mentioned notches are moved to a position in alignment, and means actuated by said reciprocating locking plate for causing said pawl to function to move the actuating plate engaged thereby until the first mentioned notch carried by the last mentioned actuating plate is out of registry with similar notches in the other actuating plates.

2. In a safety mechanism for automobile engines, a control unit including an enclosing casing, a plurality of switches arranged wholly within said casing, a rod extending from said casing, and manually movable in one direction, means extending from said rod and engaging said switches for moving the switches to open positions, means operated by said rod for locking said switches against movement, a spring for moving said rod in a return movement, said spring holding one of said switches closed, means operated by electrical current for releasing the remaining switches, and a spring acting on said remaining switches for moving the same to an open position.

3. In a safety mechanism for automobile engines, a control unit including means presenting a plurality of switches, a reciprocating rod movable manually in one direction, a spring for moving said rod in the opposite direction, means extending from said rod to engage one of said switches for moving the same to an open position, a combination lock operated by said rod for locking the last mentioned switch against movement, said spring functioning when the combination lock is in an unlocked position, means acting to hold the other of said switches closed, means operated by electrical current for releasing the other of said switches, and a spring acting on the other of said switches for moving it to an open position.

4. A lock mechanism for automobiles including a plurality of combination dials each dial having an actuating plate adjustably connected therewith, each of said plates being formed with a notch having rounded corners, a locking plate adapted to fit into said notches when the lock is in an unlocked position, a pivotally mounted arm provided with a shoulder adapted to fit over said locking plate when the same is in locked position, a link pivotally connected to the free end of said arm, said link being provided with a tooth acting as a pawl, one of said actuating plates being provided with a pawl-receiving notch adapted to receive said pawl whereby when said link is actuated the plate having the dial-receiving notch will be given a sufficient rotary movement to upset the combination, and means for rotating one of said plates not provided with said pawl-receiving notch for causing said locking plate to be actuated.

JOHN P. GERAGHTY.